United States Patent
Samson (10) Patent No.: US 6,487,647 B1
(45) Date of Patent: *Nov. 26, 2002

(54) ADAPTIVE MEMORY INTERFACE TIMING GENERATION

(75) Inventor: Eric C. Samson, Cameron Park, CA (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/998,618

(22) Filed: Dec. 29, 1997

(51) Int. Cl.⁷ .............................................. G06F 12/00
(52) U.S. Cl. ..................... 711/167; 365/233; 713/400; 713/501; 714/731; 714/744
(58) Field of Search .................. 711/167; 713/400, 713/401, 501; 714/718, 731, 744, 719; 365/233

(56) References Cited

U.S. PATENT DOCUMENTS

| | | | |
|---|---|---|---|
| 4,902,986 A | * 2/1990 | Lesmeister | ................... 331/25 |
| 4,980,585 A | 12/1990 | Bazes | |
| 5,039,950 A | * 8/1991 | McDermott | .................. 327/144 |
| 5,276,858 A | * 1/1994 | Oak et al. | .................... 711/167 |
| 5,479,647 A | 12/1995 | Harness et al. | |
| 5,552,733 A | * 9/1996 | Lesmeister | ................... 327/295 |
| 5,552,942 A | * 9/1996 | Ziperovich et al. | ........... 360/51 |
| 5,847,588 A | * 12/1998 | McDermott | .................. 327/144 |
| 5,861,879 A | * 1/1999 | Shimizu et al. | ............. 345/213 |
| 5,920,518 A | * 7/1999 | Harrison et al. | ............ 365/233 |
| 5,920,897 A | * 7/1999 | Jin et al. | ..................... 711/167 |
| 5,953,284 A | * 9/1999 | Baker et al. | ................. 365/233 |
| 6,032,274 A | * 2/2000 | Manning | .................... 714/718 |
| 6,064,707 A | * 5/2000 | Woodman, Jr. | ............. 375/373 |
| 6,101,197 A | * 8/2000 | Keeth et al. | ................. 370/517 |

* cited by examiner

Primary Examiner—Do Hyun Yoo
(74) Attorney, Agent, or Firm—Blakely, Sokoloff, Taylor & Zafman LLP (57) ABSTRACT

The invention, in one embodiment, is a method of operating a synchronous memory device generally comprising providing a clock signal to the synchronous memory device to time the operation thereof and adapting the timing of at least one of reads from and writes to the synchronous memory device to improve timing parameters for the operation thereof.

24 Claims, 11 Drawing Sheets

| WRITE COUNT | DELAY TAP | SUCCESSFUL READ | VALID COUNT | INVALID COUNT |
|---|---|---|---|---|
| 1 | 0 | NO | 0 | 1 |
| 2 | 1 | NO | 0 | 2 |
| 3 | 2 | NO | 0 | 3 |
| 4 | 3 | NO | 0 | 4 |
| 5 | 4 | NO | 0 | 5 |
| 6 | 5 | NO | 0 | 6 |
| 7 | 6 | YES | 1 | 6 |
| 8 | 7 | YES | 2 | 6 |
| 9 | 8 | YES | 3 | 6 |
| 10 | 9 | YES | 4 | 6 |
| 11 | 10 | YES | 5 | 6 |
| 12 | 11 | YES | 6 | 6 |
| 13 | 12 | YES | 7 | 6 |
| 14 | 13 | YES | 8 | 6 |
| 15 | 14 | YES | 9 | 6 |
| 16 | 15 | YES | 10 | 6 |
| 17 | 16 | NO | 0 | 0 |
| 18 | 17 | NO | 0 | 0 |
| 19 | 18 | NO | 0 | 0 |
| 20 | 19 | NO | 0 | 1 |
| 21 | 0 | NO | 0 | 2 |
| 22 | 1 | NO | 0 | 3 |
| 23 | 2 | NO | 0 | 4 |
| 24 | 3 | YES | 1 | 4 |
| 25 | 4 | NO | 0 | 6 |
| 26 | 5 | YES | 1 | 6 |
| 27 | 6 | YES | 2 | 6 |
| 28 | 7 | YES | 3 | 6 |
| 29 | 8 | YES | 4 | 6 |
| 30 | 9 | YES | 5 | 6 |
| 31 | 10 | YES | 6 | 6 |
| 32 | 11 | YES | 7 | 6 |
| 33 | 12 | YES | 8 | 6 |
| 34 | 13 | YES | 9 | 6 |
| 35 | 14 | YES | 10 | 6 |
| 36 | 15 | NO | 0 | 0 |
| 37 | 16 | YES | 1 | 0 |
| 38 | 17 | NO | 0 | 0 |
| 39 | 18 | NO | 0 | 0 |
| 40 | 19 | NO | 0 | 0 |

*FIG. 11*

ADAPTIVE MEMORY INTERFACE TIMING GENERATION

BACKGROUND OF THE INVENTION

1. Field of the Invention

The present invention generally pertains to signal timing for memory access and, more particularly, to adaptive memory interface timing generation.

2. Description of the Related Art

Computers typically include a number of interconnected, discrete components that communicate over "buses" and share a variety of system resources. One or more processors generally execute programmed instructions stored in memory and communicate with the outside world using a number of input/output ("I/O") techniques. The processor usually breaks down the programmed tasks into subtasks and parcels the subtasks out to other components to perform. For instance, the processor may instruct an I/O controller to handle I/O functions and a memory controller to manage memory functions. Since more than one component uses the various buses and because these components frequently operate relatively independently of one another, the receipt and transmission of signals must be properly timed.

Signal timing is provided by one or more timing signals, or "clocks," within the computer. A computer includes what might be called a "system clock," which is an electrical signal oscillating at a particular frequency. Some computer components may need to operate at frequencies higher than that of the system clock and, so, some components have their own internal clock signals. Internal clocks typically have a frequency different from, and generally higher than, that of the system clock. Examples of such components include processors, such as microprocessors and digital signal processors ("DSPs"), and controllers, such as graphics and memory controllers.

Historically, system-wide timing constraints required all components to operate on the system level relative to the system clock to provide a common timing reference with which to coordinate their operation and use of system resources. For example, a processor might request a memory controller to provide certain information from memory over the data bus, which request requires both the processor and the memory controller each to perform several discrete actions. Both the processor and the memory controller have internal clocks operating independently of one another that are used to perform the discrete actions without regard to what is happening internally of the other component. The processor and the controller, however, both synchronize their internal clocks to the system clock. Thus, the processor can coordinate its receipt of the information transmitted by the memory controller over the data bus because the receipt and transmission are both performed relative to the system clock.

One disadvantage to this historical approach was that the processor essentially had to wait around to receive the requested data from the memory controller. The processor could not be sure when the memory controller would have the data ready and so would simply wait. Early on, this was not significant as memory outperformed processors in terms of speed. However, recent advances in processor design emphasize this disadvantage as processors operate at ever higher frequencies. The disadvantage is also exacerbated by the increasing amount of data that must be handled by processors and memory.

One technique addressing this disadvantage uses synchronous dynamic random access memory ("SDRAM"). The internal clock of the memory controller is directly synchronized to the internal clock of the processor and controls the operations of the SDRAM devices. More particularly, the SDRAM device is designed so that all operations are synchronized to a positive edge clock, i.e., upon when an input clock, which is nominally the memory controller internal clock, rises. The SDRAM is also designed to always perform read and write operations within a certain number of clock cycles. The processor consequently knows when the SDRAM and the memory controller will have the data ready for transmission and can perform other tasks in the meantime. In addition to being quicker, this technique also simplifies the control interface between the memory controller and the rest of the system and is less expensive to manufacture.

Thus, the SDRAM receives an external clock signal that times its operations. An SDRAM receives a command and accordingly stores data written to the SDRAM or outputs data read from the SDRAM within a certain number of cycles. For data to be written to or read from the SDRAM reliably, the data must be determinate for some period of time before the operation is performed. The period of time is called the "setup" time. Similarly, that data must be determinate for a period of time after the operation begins. This period of time is called the "hold" time. Implementations employing SDRAMs, and other types of synchronous memory devices, must observe setup and hold times to operate correctly.

Conventional SDRAM designs also have drawbacks. They statically use the same clock to time both the transmission and the receipt of data signals, thus forcing awkward board layouts to deal with common timing problems such as clock-to-out and flight time mismatches. They also fail to track operating characteristics such as temperature, voltage, and component specific variations. All of these characteristics affect component operation to some degree and, hence, the timing requirements for signals transmitted to and from the component.

Some conventional SDRAM designs employ line matching buffers to cope with some of these drawbacks by reducing board sensitivity. However, although SDRAMs receive timing on writes thereto, they do not send out timing on reads therefrom. Line matching buffers, while canceling out adverse factors affecting writes to the SDRAM, thererfore do not affect the reads therefrom. Thus, this technique does not compensate for the SDRAM itself.

To account for these effects, system designers typically provide greater tolerances in the timing scheme. System designers typically use what might be called "effective" setup and hold times. The effective setup and hold times are longer than are the actual setup and hold times required by the SDRAM. Thus, in the event there are any timing delays caused by such extraneous factors, the extra time will ensure the data is determinate for at least the actual setup and hold period.

This approach has been effective because of the increased performance available from SDRAMs. The SDRAMs were so efficient the design could afford a little extra margin in the setup and hold periods even in light of faster processor speeds. However, increasing demands for higher system performance require tighter timing controls to reduce delays in overall system operation. Thus, there consequently is a need for a new technique for timing data transmission to and from SDRAMs.

The present invention is directed to overcoming, or at least reducing the effects of, one or more of the problems set forth above.

SUMMARY OF THE INVENTION

The invention, in one embodiment, is a method of operating a synchronous memory device generally including providing a clock signal to the synchronous memory device to time the operation thereof and adapting the timing of at least one of reads from and writes to the synchronous memory device to improve timing parameters for the operation thereof.

BRIEF DESCRIPTION OF THE DRAWINGS

Other objects and advantages of the invention will become apparent upon reading the following detailed description and upon reference to the drawings in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Numerous specific details are set forth below in the detailed description of particular embodiments to provide a thorough understanding of the present invention. However, one of ordinary skill in the art having the benefit of this disclosure will understand that the present invention may be practiced without many of the details presented since such details will be necessary or useful depending on the particular embodiment being employed. Conversely, in other instances, well known details have not been described for the sake of clarity so as not to obscure the invention. It will be appreciated that supplying such details would be a routine undertaking for those of ordinary skill in the art, even if a complex and time-consuming task, given the benefit of this disclosure.

Figure 1:
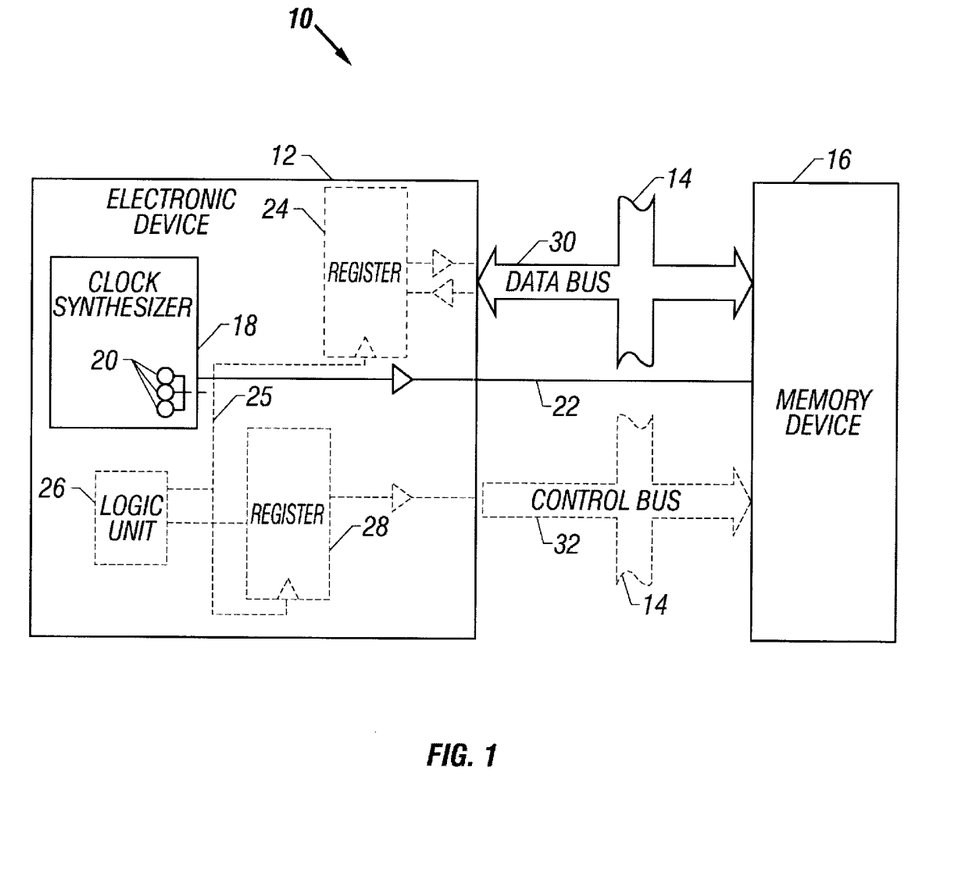
FIG. 1 depicts an embodiment of an apparatus constructed and operating in accordance with the present invention.

FIG. 1 depicts one embodiment of an apparatus 10 constructed and operated in accordance with the present invention. The apparatus 10 comprises an electronic device 12, a bus 14, and a device 16 containing memory. The device 16 may be, in some embodiments, a synchronous memory device. A "synchronous memory device" as used herein refers to any memory device whose read and write operations are timed relative to an external clock including, but not necessarily limited to, an SDRAM. However, the invention is not so limited as the present invention may be used to adapt timing interfaces with any device containing memory, whether the interface be synchronous or asynchronous.

The electronic device 12 includes a clock synthesizer 18 having a plurality of phase taps 20 conceptually illustrated in FIG. 1. The clock synthesizer 18 may be any type of delay line known to the art so long as it provides a plurality of taps 20 from which timing signals may be drawn. The clock synthesizer 18 generates a clock signal from which multiple timing signals may be derived by tapping the phase taps 20. The device 16 in the embodiment of FIG. 1 transfers data over the bus 14 and receives a timing signal $t_1$ from the clock synthesizer 18 over the line 22. The timing signal $t_1$ is the signal that controls the operation of the memory device 16. The electronic device 12 may transmit data, commands, or both, to the device 16 as described more fully below.

The electronic device 12 provides a plurality of phase taps 20 for a timing signal $t_2$. If the electronic device 12 writes data to and receives data from the memory device 16, it is done through the register 24, which is controlled by the timing signal $t_2$ received over the line 25. If the electronic device 12 transmits commands to the memory device 16, it does so through the register 28, which is also controlled by the timing signal $t_2$ received over the line 25.

The present invention synchronizes the operation of the memory device 16 by adapting the timing of at least one of reads from and writes to the device 16 to improve timing parameters for the operation thereof. For example, the timing signal $t_2$ may be selected to yield increased setup and hold time margins for data and command transmission between the electronic device 12 and the memory device 16 as discussed below. As will be appreciated by those in the art, the adaptation of the timing signal $t_2$ in this manner is not the same as synchronizing the timing signal $t_2$ to the timing signal $t_1$ although some embodiments do this as well. Rather, the adaptation of the timing signal $t_2$ permits longer setup and hold time margins, thereby permitting tighter timing requirements and more efficient operation of the memory device 16.

In one particular embodiment of the apparatus 10, the electronic device 12 is a graphics controller and the device 16 is an SDRAM. The electronic device 12 writes the data to and reads the data from the memory device 16 over the bus 14 via the register 24. Similarly, the logic unit 26 of the electronic device 12 generates the SDRAM command which the electronic device 12 transmits to the memory device 16 over the bus 14 via the register 28. The bus 14 therefore comprises both a data bus 30 and a control bus 32 as is commonly encountered in the art. Note that, in some embodiments, the data and the commands need not necessarily both originate from the same electronic device. Hence, the data register 24 and the command register 28, and their associated circuitry, are shown in ghosted lines in FIG. 1. In the embodiment of FIG. 1, data and commands are clocked out of the register 24 and 28, respectively, as controlled by the timing signal $t_2$ received over the line 25. Data is similarly clocked into the register 24 as controlled by the timing signal $t_2$.

Figure 2:
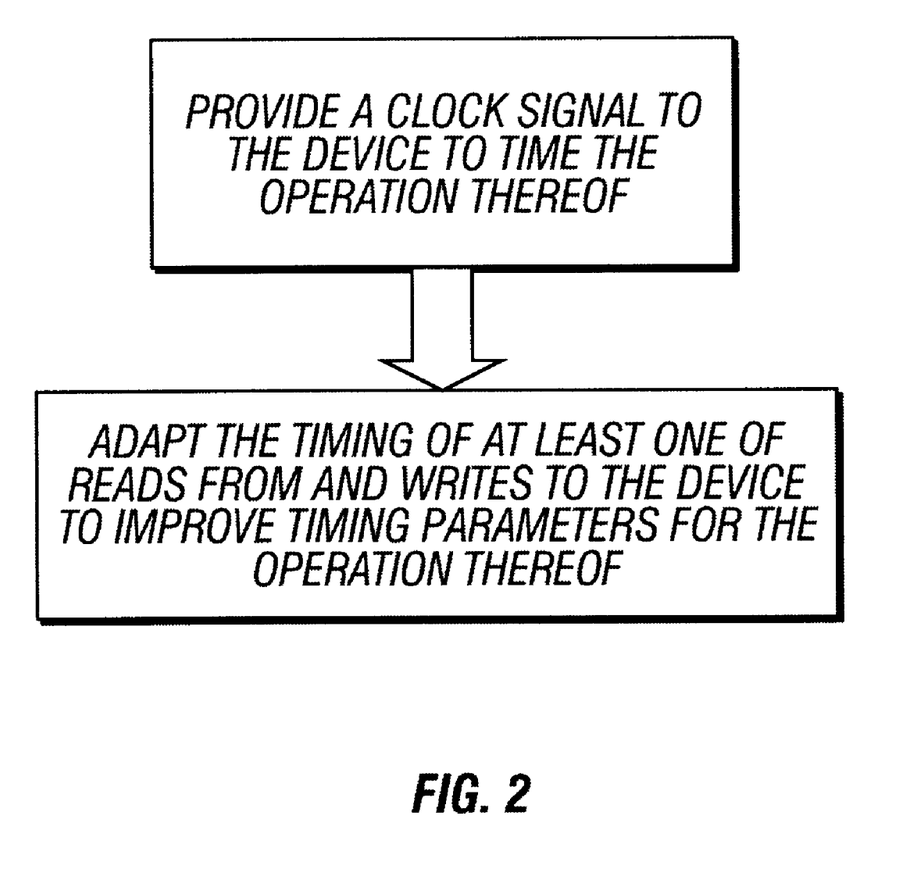
FIG. 2 illustrates one particular embodiment of a method for adapting the timing interface of a device including memory in accordance with the present invention.

The invention, in one particular embodiment illustrated in FIG. 2, is a method of operating the device 16 as may be implemented using the apparatus 10 of FIG. 1. The method generally comprises providing a clock signal $t_1$ to the device 16 to time the operation thereof and adapting the timing of at least one of reads from and writes to the device 16 to improve timing parameters for the operation thereof. As will be apparent from the discussion below, the invention may be practiced in numerous embodiments. For instance, the method of FIG. 2 in various alternative embodiments may be employed in either synchronous or asynchronous timing interfaces. Similarly, alternative embodiments may employ the method of FIG. 2 during initialization of a memory-containing device or during loop update as discussed below in connection to FIG. 9. Each of these variations are within the scope and spirit of the invention as claimed below.

Figure 3:
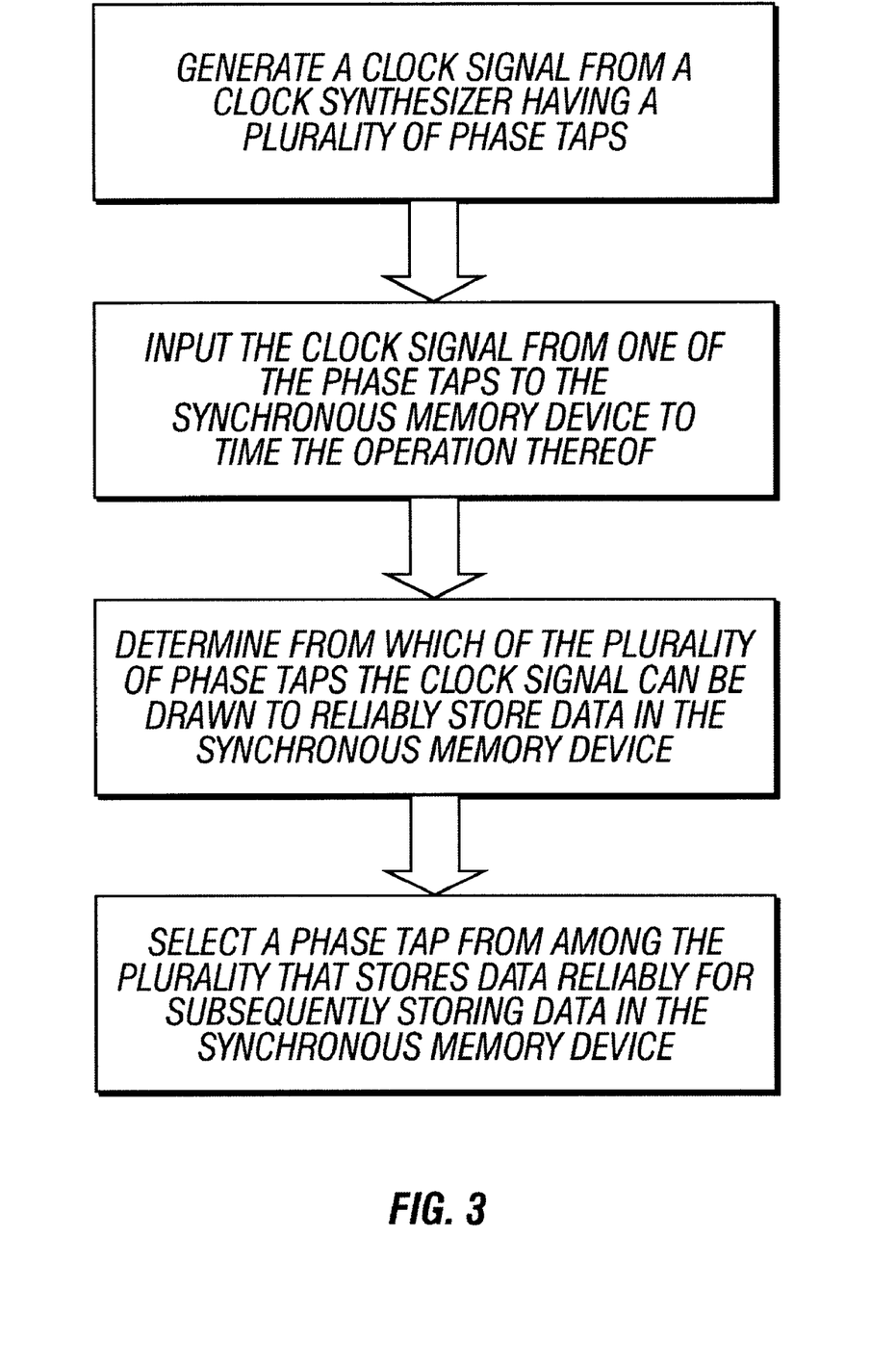
FIG. 3 illustrates a first variation on the particular embodiment of FIG. 2.

FIG. 3 illustrates one manner in which this embodiment may be implemented. As shown in FIG. 3, a clock signal is generated from the clock synthesizer 18 having a plurality of phase taps 20. The clock signal is then input from one of the phase taps 20 to the device 16 via the line 22 to time the operation thereof. Next, a determination is made as to which of the plurality of phase taps 20 the clock signal can be drawn to reliably store data in the device 16. Finally, a particular phase tap 20 is selected from among the plurality that stores data reliably for subsequently storing data in the device 16.

Figure 4:
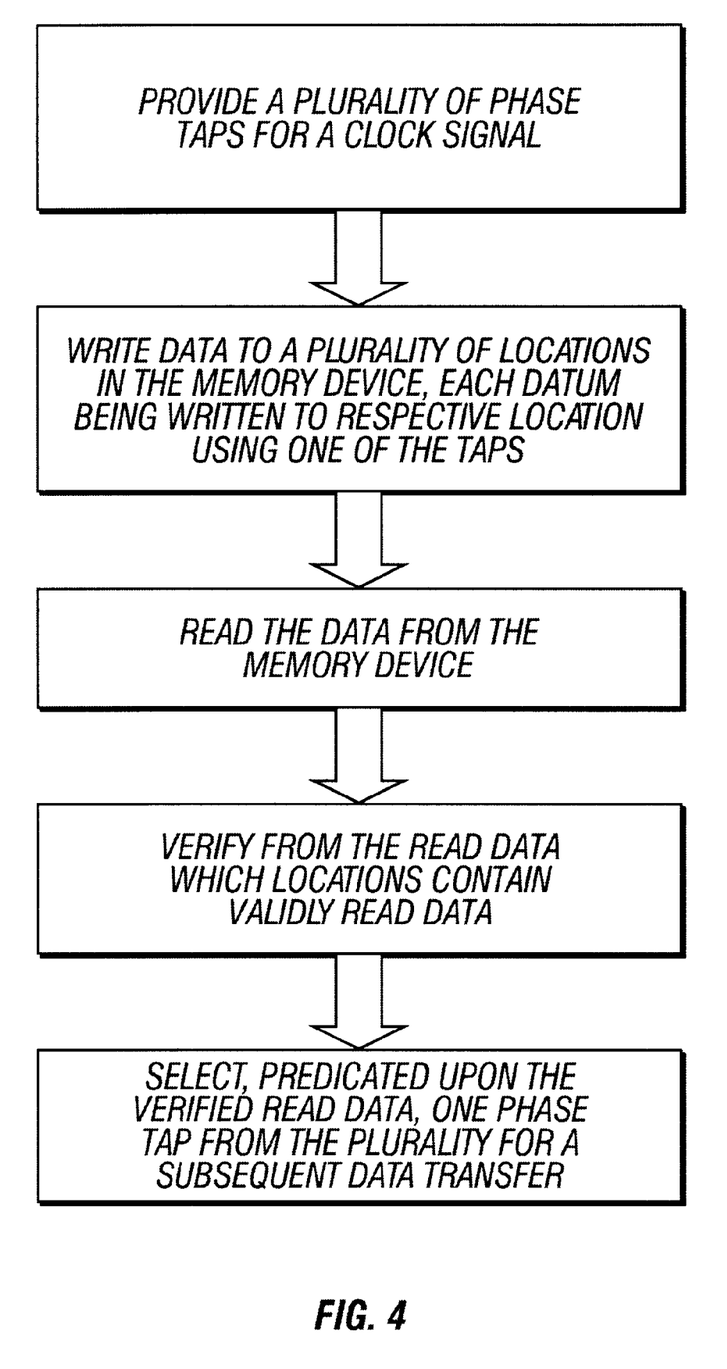
FIG. 4 illustrates one particular embodiment of the method in FIG. 3.

FIG. 4 illustrates one particular embodiment of how it may be determined which phase taps may be used to store data reliably and select one for subsequent transfers in one variation of the method in FIG. 3. As set forth in FIG. 4, the memory device 16 receives data written thereto, each datum being written using a respective one of the taps 20. The memory device 16 then outputs onto the bus 14 data read from the memory device 16 to verify which data were validly read such that one of the phase taps 20 may be selected from the plurality for a subsequent data transfer. The selection of the one phase tap 20 from the plurality is predicated on the verified read data in a manner such as that set forth below relative to FIGS. 7–12.

Figure 5:
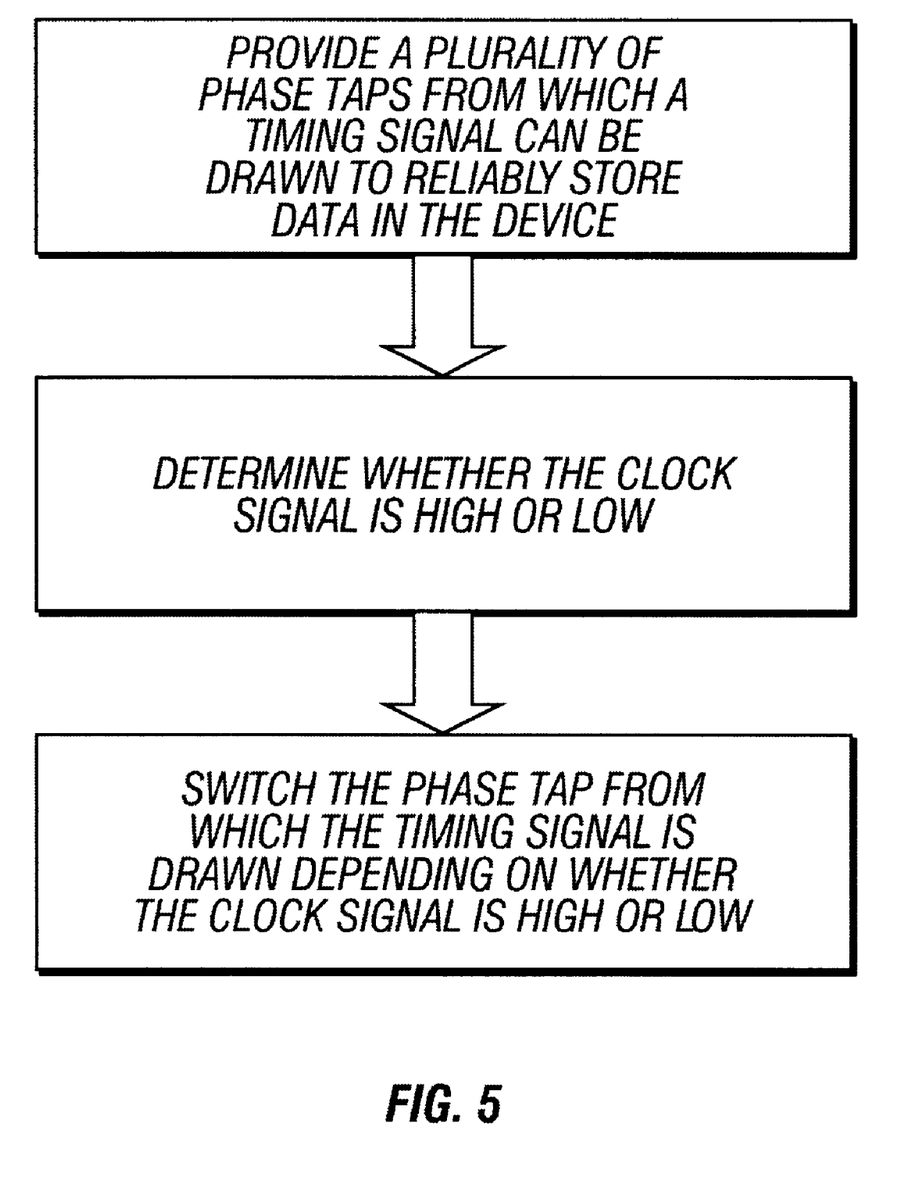
FIG. 5 illustrates a second variation on the particular embodiment of FIG. 2 alternative to the variation of FIG. 3.

FIG. 5 illustrates a technique for adapting the timing in the method of FIG. 2 alternative to that employed by the embodiment of FIG. 3. For purposes of illustration, the technique of FIG. 5 is disclosed in the context of the loop update state for a device containing memory as is discussed more fully in connection with FIG. 9 below. However, the technique of FIG. 5, like that of FIG. 3, may be employed either during initialization, during the loop update, or both. Those skilled in the art having the benefit of this disclosure will be able to readily extrapolate the disclosure in the loop update cycle to implement the technique during initialization.

Figure 6:
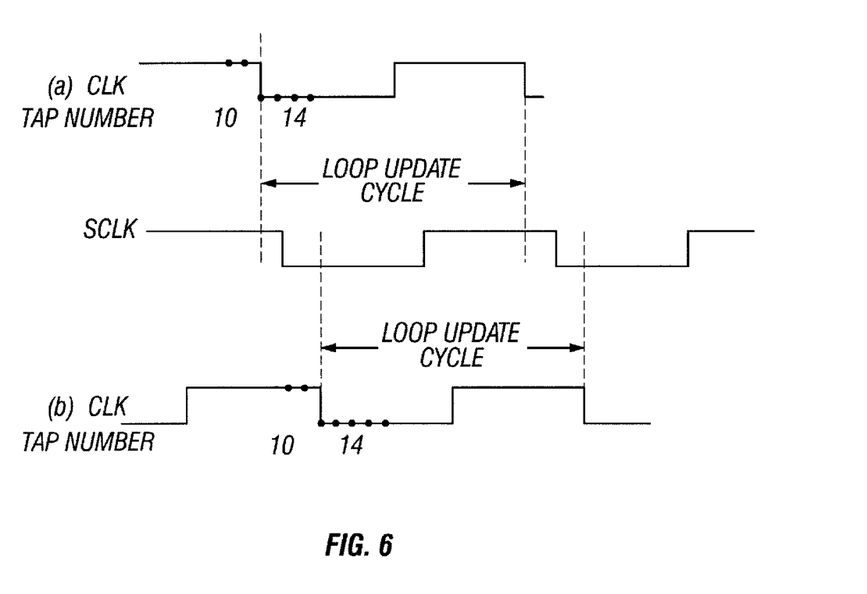
FIG. 6 is a timing diagram illustrating the variation of FIG. 5.

Referring now to FIG. 5, if $t_1$ is high when the loop update cycle begins, the tap can be shifted one up. If $t_1$ is low when the loop update cycle begins, then the tap can be shifted one down. FIG. 6 illustrates two alternative scenarios (a) and (b) wherein $t_1$ is high and low, respectively, relative to the respective $t_2$ signals. In both scenarios (a) and (b), the tap is set to tap 12 at the time the loop update cycle begins. Thus, the tap should be shifted to tap 13 in scenario (a) and to tap 11 in scenario (b).

Figure 7:
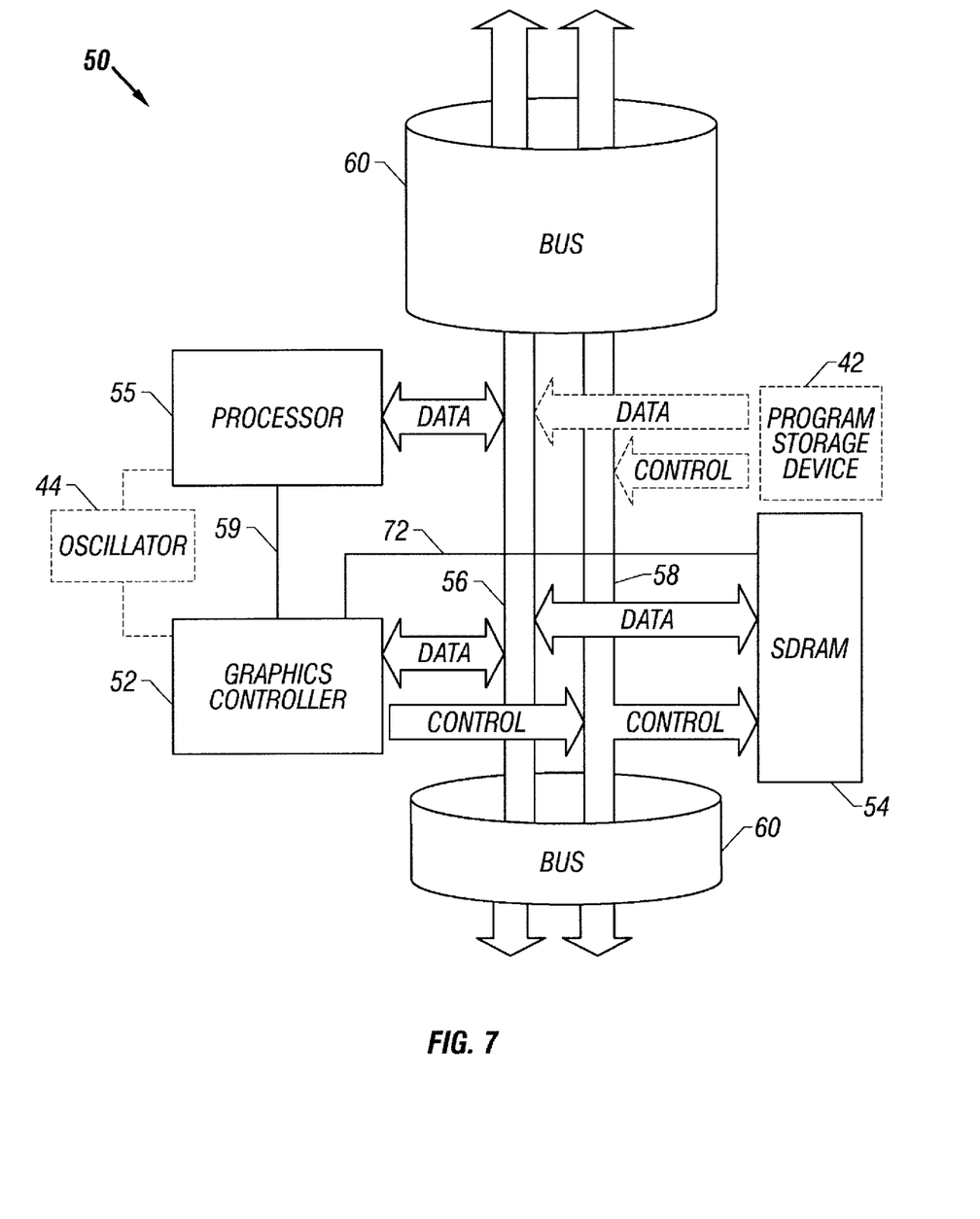
FIG. 7 depicts one particular embodiment of an apparatus with which the present invention may be employed.
Figure 8:
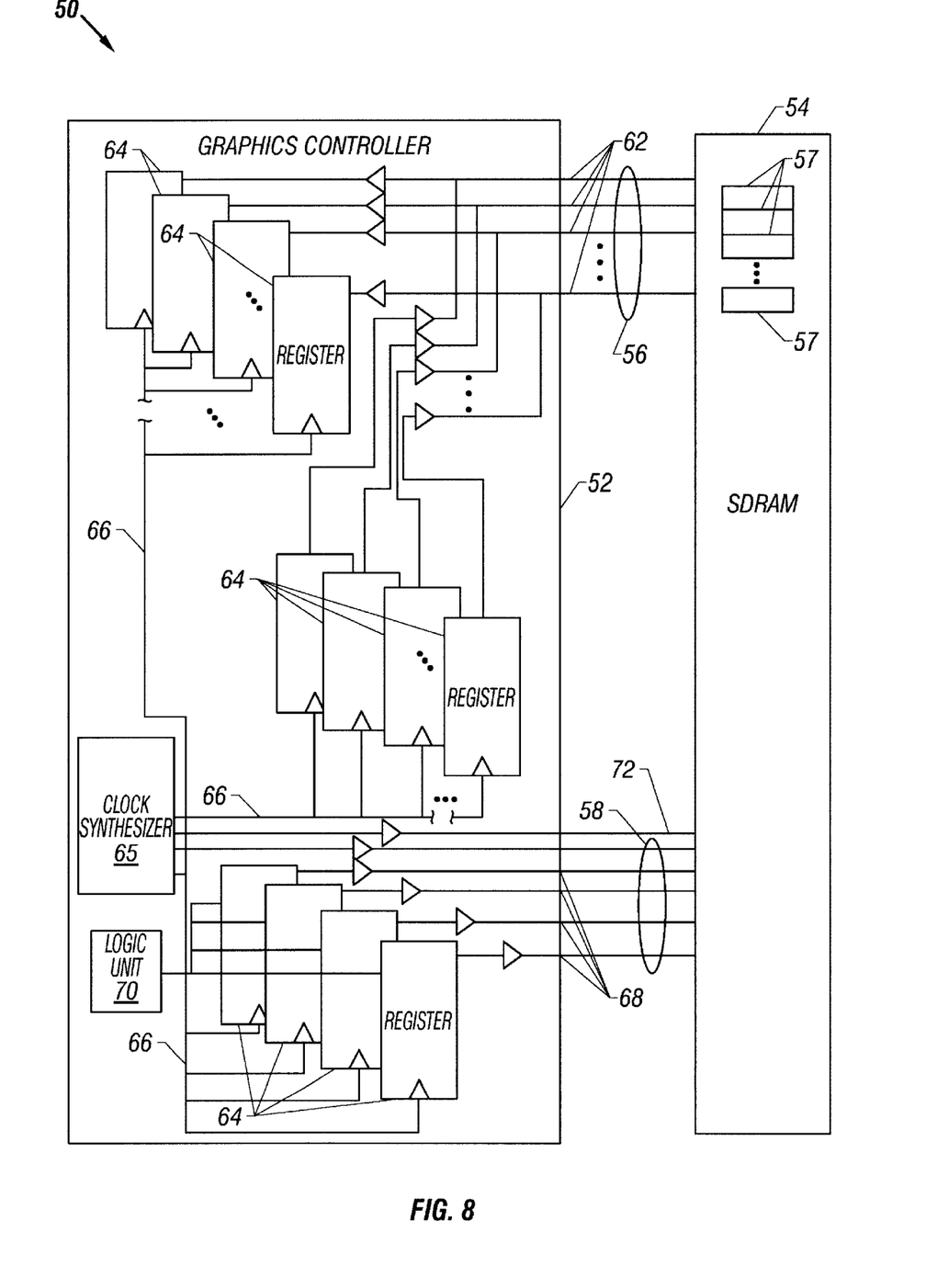
FIG. 8 details, in part, the interface between the controller and the synchronous memory device of the apparatus in FIG. 7.
Figure 9:
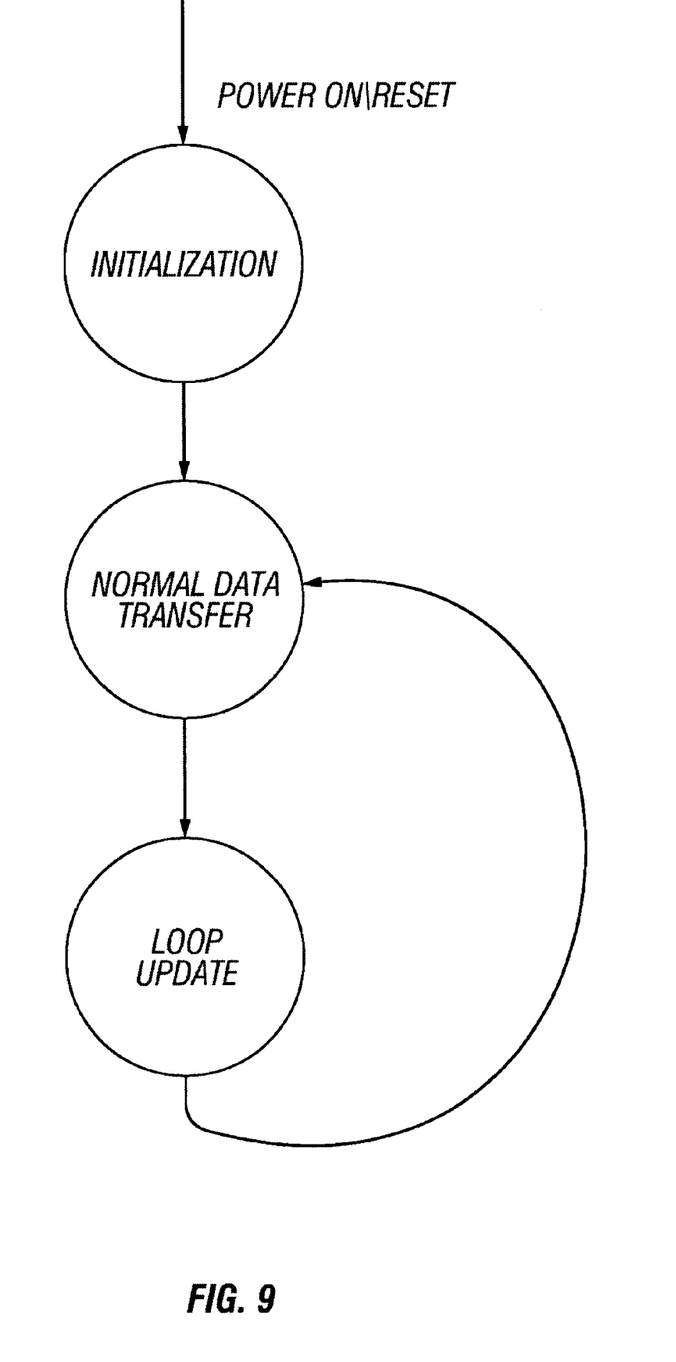
FIG. 9 conceptually diagrams a state machine describing the operation of the synchronous memory device of FIG. 8.
Figure 10:
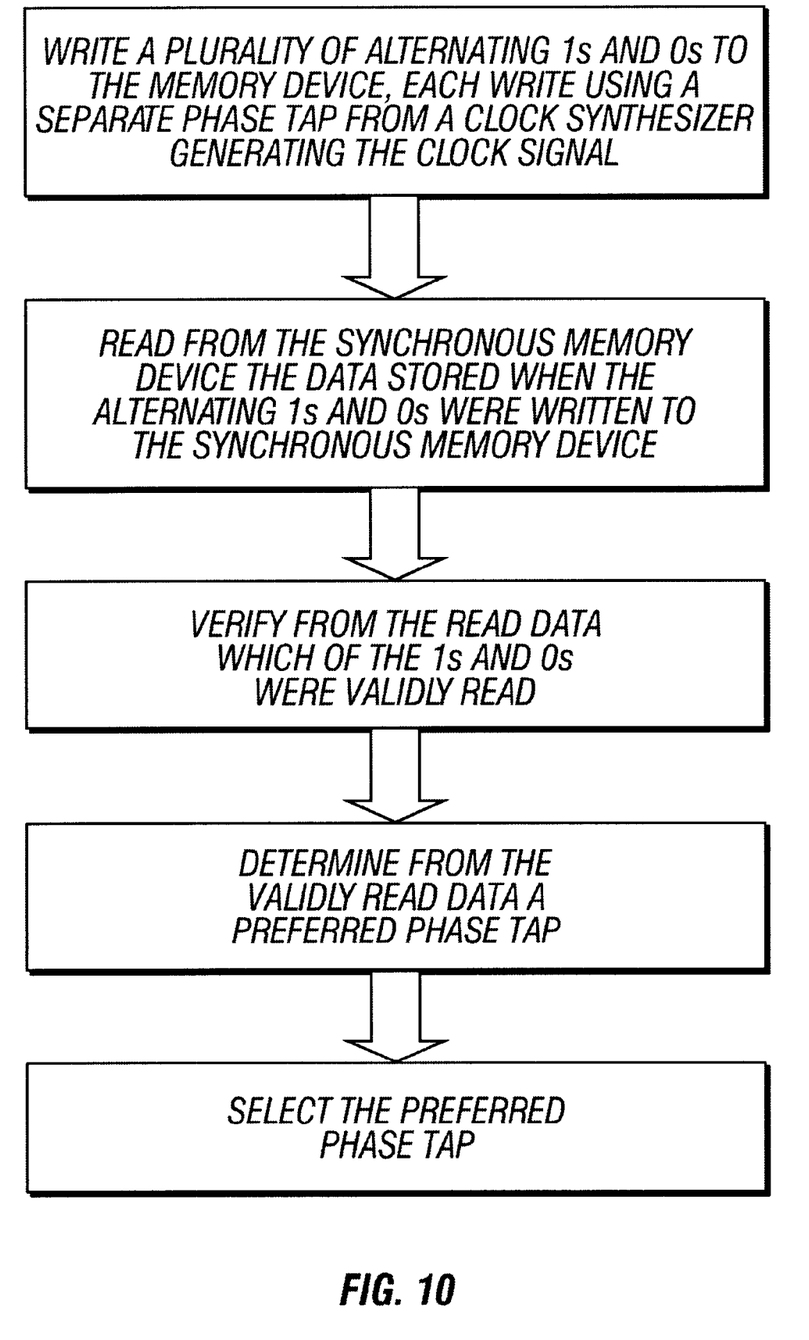
FIG. 10 illustrates one embodiment of a method practiced in accord with the invention using the apparatus of FIG. 7.

FIGS. 7–12 provide additional detail on how the variation in FIG. 4 may be implemented. FIG. 7 depicts an apparatus 50 with which the present invention may be practiced, including a graphics controller 52 and SDRAM 54 between which there is an adaptive timing interface in accord with the present invention. FIG. 8 details the structural interface between the graphics controller 52 and the SDRAM 54 while FIG. 9 conceptually diagrams a state machine describing the operation of the SDRAM 54 in this particular embodiment. FIG. 10 illustrates one embodiment of a method practiced in accord with the invention using the apparatus 50 of FIG. 7.

Returning to FIG. 7, the apparatus 50 comprises a graphics controller 52 that writes data to and receives data from an SDRAM 54 over a data bus 56. The graphics controller 52 also issues commands to the SDRAM 54 over a control bus 58. The data bus 56 and the control bus 58 together comprise a data and control bus 60. The apparatus 50 also includes a processor 55. Each of the graphics controller 52, the SDRAM 54, and the processor 55 may be of any type known to the art to be suitable in light of this disclosure. For instance, the processor 50 may by any suitably programmed processor but may, in some embodiments, be a graphics processor or co-processor.

Turning now to FIG. 8, the data bus 56 between the graphics controller 52 and the SDRAM 54 is 64 bits wide, of which only a representative sample is shown, in this particular embodiment. Each of the ports 62 through which data enters and exits the graphics controller 52 over the data bus 56 is buffered by a register 64 in a manner well known to the art. Each register 64 receives a timing signal $t_2$ generated by the clock synthesizer 65 on a respective line 66.

The control bus 58 between the graphics controller 52 and the SDRAM 54 is 5 bits wide and transmits command signals generated by the logic unit 70 to the SDRAM 54. The SDRAM 54 is of conventional design, and therefore operates responsive to a 4-bit command word comprised of the column address strobe ("CAS'"), row address strobe ("RAS'"), chip select ("CS'"), and write enable ("WE'") bits as are well known in the art. Additionally, the SDRAM 54 receives a clock enable ("CKE") signal over the control bus 58. Each of the ports 68 through which control data is transmitted to the SDRAM 54 is buffered by a register 64 receiving the timing signal $t_2$ on a respective line 66 in a manner well known to the art.

The clock synthesizer 65 in the particular embodiment of FIG. 8 is a programmable delay lead loop ("DLL") having a plurality of phase taps (not shown) such as is known in the art. Alternative embodiments may employ a DLL that is not programmable. The particular DLL 65, has twenty such phase taps, although the number of phase taps will vary with the particular implementation. One DLL design suitable for this particular implementation is disclosed and claimed in U.S. Pat. No. 4,980,585, which patent is hereby expressly incorporated by reference in its entirety and for all purposes.

In addition to generating and transmitting the timing signal $t_2$, the DLL 65 receives and/or transmits the target timing signal $t_1$ to the SDRAM 54 over the line 72 depending on the particular implementation. In the particular embodiment of FIG. 8, the DLL 65 both transmits and receives. The timing signal $t_1$ may be taken from the processor 55 over the line 59 shown in FIG. 7 or received from an external oscillator 44, shown in ghosted lines in FIG. 7 also driving the processor 55.

Referring now to FIG. 9, the SDRAM 54 operates according to the state diagram set forth therein. Whenever the computer (not shown) including the apparatus 50 is powered-on or reset, the SDRAM 54 is initialized by the basic input/output system ("BIOS"). In the vernacular, the SDRAM 54 is initialized whenever the computer is "booted." The BIOS may be encoded on a program storage device 42, shown in ghosted lines in FIG. 7. In some embodiments, the program storage device 42 may be a read only memory ("ROM") device. Once initialization is over, the SDRAM 54 enters normal data transfer mode in which read and write operations are performed in a conventional manner. Periodically, though seldomly, a "loop update cycle" is performed.

In some embodiments, the method of FIG. 4 is performed only in the initialization state. In other embodiments, the method of FIG. 4 is performed only in the loop update state. In still others, the method of FIG. 4 is performed in both the initialization state and the loop update state. For illustrative purposes, the latter type of embodiment will be discussed although it is to be understood that the invention is not so limited.

Referring now to FIGS. 7 and 10, when the computer (not shown) is booted, the processor 55 initializes the components thereof, including those of the apparatus 50 in FIG. 7, according to the computer's BIOS. This includes initializing the graphics controller 52 and the SDRAM 54. As part of initializing the graphics controller 52, the DLL 65 is programmed to output the timing signals $t_1$ and $t_2$ from a predetermined one or two of the phase taps as is known in the art. The timing signal $t_1$ and the initial timing signal $t_2$ are selected with ample setup and hold times in accord with conventional practice as if the invention were not going to be employed. The frequency of the timing signals $t_1$ and $t_2$ are also programmably determined as known in the art. The frequency during this training period is normally lower than the operating frequency although this is not necessary for the practice of the invention.

The graphics controller 52 then writes data to the SDRAM 54 to a plurality of locations 57 therein, each datum being written to a respective location 57 using one of the taps. More particularly, the graphics controller 52 writes a plurality of 1s and 0s to the memory device 54. As each datum is clocked out of the register 64, the timing signal $t_2$ is drawn from a different phase tap. In alternative embodiments, a single location 57 may be used to read and write data to in multiple read/write cycles, the timing signal $t_2$ for each read/write cycle being drawn from a different phase tap.

The locations 57 may be reserved solely for this part of the initialization or may be any generally available locations. If the locations 57 are not reserved for this purpose, the data originally stored therein can be copied to one or more registers in the graphics controller 52. The original data can then be copied back to the original locations 57 once the timing interface has been adapted and before normal data transfer resumes. The locations 57 are conceptually illustrated as contiguous, but this is not necessary to the practice of the invention in all embodiments.

The written data is then read from the locations 57 of the memory device 54. More precisely, data is read from the locations 57 to which the alternating 1s and 0s were earlier stored. The data may be read by the graphics controller 52, using the initial timing signal $t_2$ to clock the data into the register 64.

The read data is then verified to see which data were stored successfully. A successful store implies a valid write and a valid read. Thus, verifying the read data will detect either an invalid write or invalid read. The processor 55 may perform this task in execution of the BIOS or, alternatively, this task may be performed in the state machine of the graphics controller 52. In the particular embodiment illustrated, the processor 55 performs it in execution of the BIOS.

Figure 11:
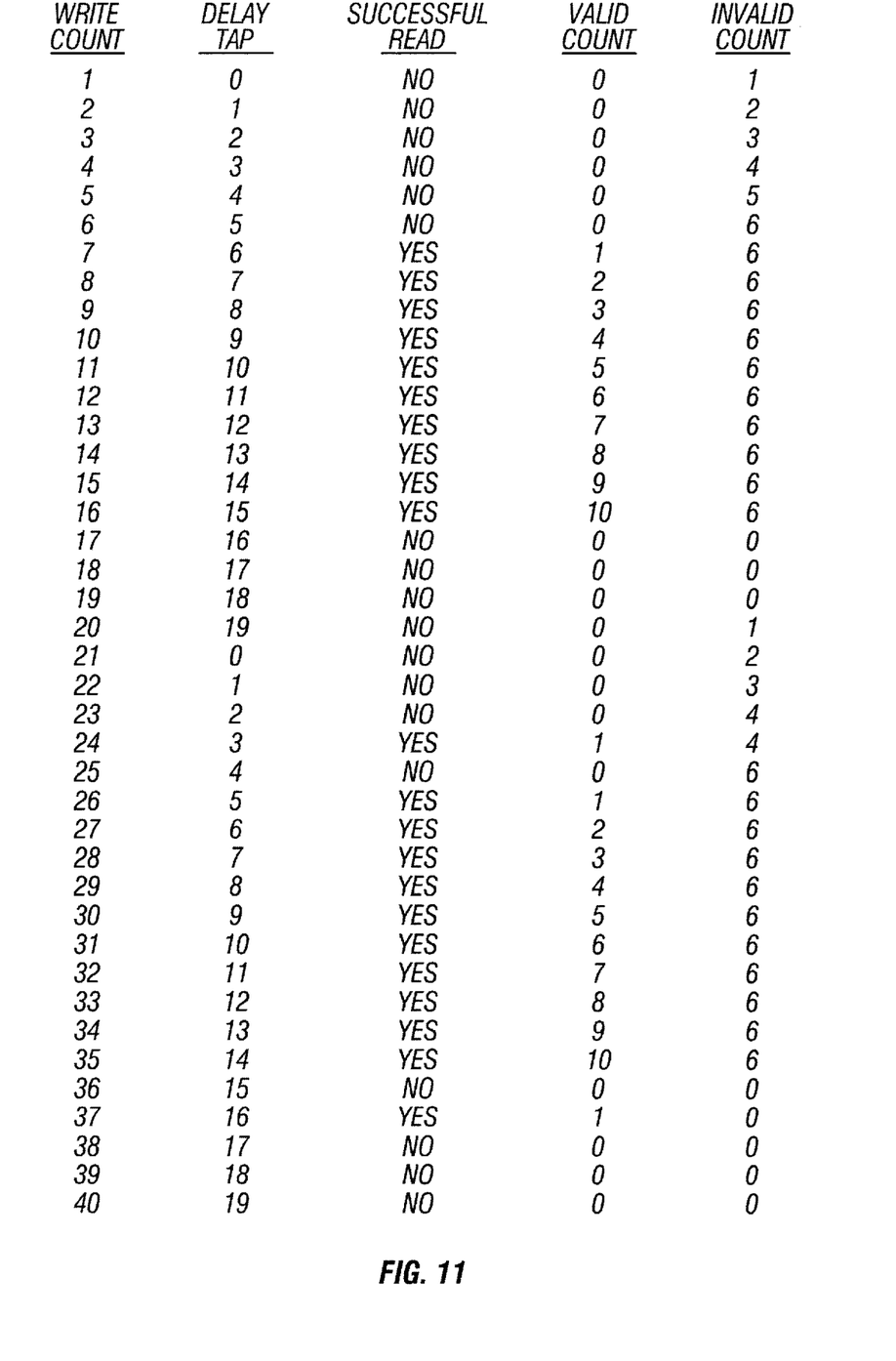
FIG. 11 is a table of counts such as may be maintained in practicing the method of FIG. 10 with the apparatus of FIG. 7.

FIG. 11 illustrates a theoretical use of valid read and invalid read "counts" in the particular method under discussion. The column labeled "Write Count" is maintained only for reference in this discussion. This particular embodiment does not maintain an actual write count although some other embodiments may. As mentioned earlier, the DLL 65 in this particular embodiment has 20 taps. Each of the 20 taps is used to write a single datum to a location 57 in the SDRAM 54 in a pattern of alternating 1s and 0s twice over. From FIG. 11, writes 1–6 on taps 0–5 and writes 17–20 on taps 16–19 yielded invalid reads, and so invalid stores, while writes 7–16 on taps 6–15 yielded valid reads, and so valid stores. The "Valid Count" initializes at 0 (not shown), begins incrementing at write 7 (the first valid store), increments through write 16 (the last valid store), and clears at write 17 (the first invalid store after the first successful store. The "Invalid Count" initializes at 0 (not shown), begins incrementing at write 1 (the first bad read), stops incrementing at write 7 (the first successful read), and clears at write 17 (the first unsuccessful read after the first good read).

The processor 55 knows that the data written comprised alternating 1s and 0s and that it was written to an empty location 57. Thus, if a 1 or 0 is read when a 0 or 1 is expected, respectively, the corresponding datum was not validly stored.

The processor 55 maintains two counts, a count of valid reads and a count of invalid reads. The valid read count begins at zero, is incremented upon encountering a successful read, and cleared when an unsuccessful read is encountered. The invalid read count also begins at zero. However, the invalid read count is incremented upon encountering a bad read and cleared upon encountering the first bad read after a successful read.

As mentioned, FIG. 11 illustrates two series of writes of the 20 taps. Some embodiments might use only one series or more than two, depending on whether a statistically representative sampling is desired and how representative the sampling will be. Note that FIG. 11 shows both a good read and a bad read off taps 3 and 15. These taps obviously are unreliable and such variations are to be expected to some degree. Thus, a representative sampling might be desired. Alternatively, counts below some predetermined value may be ignored or some form of noisy measurement filtering might be applied.

One phase tap is then selected from the plurality for a subsequent data transfer, the selection being predicated on the verified read data. In this particular embodiment, the preferred tap at the training frequency is tap 5 because it falls in the middle of the successful reads. The preferred tap at the training frequency is not necessarily the preferred tap at the operating frequency. Generally, the preferred tap at the operating frequency is that which will provide a sampling point a quarter of a read data waveform period offset from the timing signal $t_1$ at the operating frequency.

The preferred tap for the training frequency must therefore be translated to find the preferred tap at the operating frequency. One translation calculates the preferred tap using the following formula:

$$T_o = \tfrac{1}{2}(N_{to} - N_{vt}) + C_{it}$$

where:
- $T_o$=preferred tap at the operating frequency;
- $N_{to}$=total number of taps at the operating frequency;
- $N_{vt}$=number of valid taps at the training frequency; and
- $C_{it}$=invalid count derived at the training frequency.

The formula is derived from the relationship between the number of taps at the two frequencies, wherein the ratio of the number of taps at the operating frequency to the number of taps at the training is frequency is equal to the ratio between the operating and training frequencies.

Figure 12:
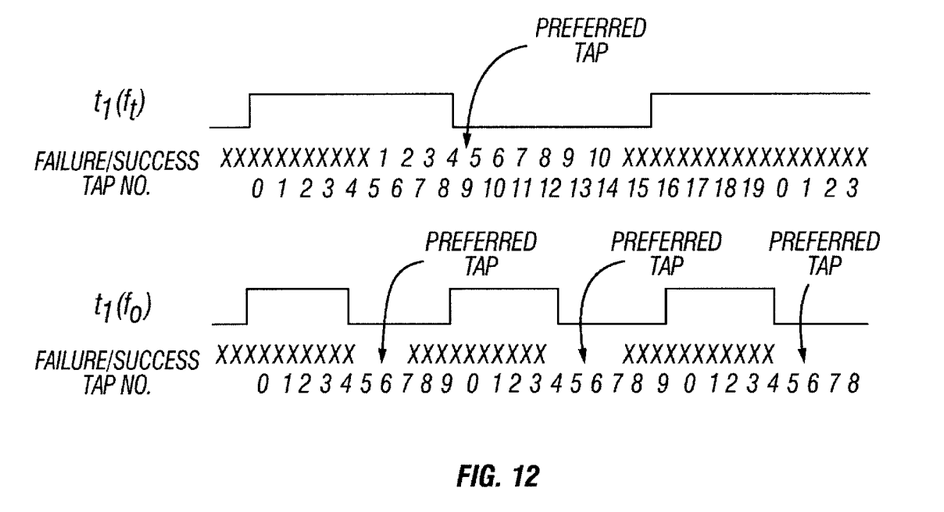
FIG. 12 is a timing diagram illustrating selection of a preferred tap at an operating frequency from the counts in the table of FIG. 11 at the training frequency.

FIG. 12 illustrates application of the formula to the embodiment whose counts are shown in FIG. 11. As shown in FIG. 12, the operating frequency $f_o$ is twice the training frequency $f_t$ and, as will be appreciated by those in the art having the benefit of the disclosure, only half as many taps may be utilized at the operating frequency. Applying the formula above to the counts of FIG. 11 and the frequencies shown in FIG. 12, the preferred tap at the operating frequency for this particular embodiment is tap 6.

Referring again to FIG. 9, once the preferred tap is selected and the BIOS is completed, the SDRAM 54 enters normal data transfer operations. The sampling point for data latching having been established during initialization, it may be updated during the loop update state discussed below. Consequently, normal data transfers are no different than in SDRAM operations not employing the present invention except that sampling back to the core clock domain must be done. This can be done using traditional techniques.

Returning to FIGS. 7–12, the method of FIG. 3 can be employed when the SDRAM 54 is in the loop update state illustrated in FIG. 9. The SDRAM 54 enters the loop update state periodically, although at a rate insignificant with respect to data rates. For example, a rate less than or equal to twice the refresh rate of the SDRAM 54 might be employed. The method of FIG. 3 is performed for one or two taps at a time over a series of loop updates, thus spreading the method out over time. In this context, it may be desirable to reserve the locations 57 used to perform the method. Note that the method of FIG. 4, as disclosed above may also be employed to adapt the timing of reads and/or writes during the loop update state.

Yet other alternatives might be employed to update the loop in the loop update state. For instance, if it is known that certain bits of data are guaranteed to switch (i.e., not always fixed), then no reserved memory location is required and the training can be based on the known data transitions. Still other techniques for updating the loop may be used as well.

The methods of FIGS. 3 and 5 may be employed in a variety of ways to implement the method of FIG. 2 in a memory-containing device whose operation is described by the state diagram of FIG. 9. For instance, at least the following implementations are available:

(a) the variation of FIG. 3 during initialization;
(b) the variation of FIG. 5 during initialization;
(c) the variation of FIG. 3 both during initialization and loop update;
(d) the variation of FIG. 5 both during initialization and loop udate;
(e) the variation of FIG. 3 during initialization and the variation of FIG. 5 during loop update; and
(f) the variation of FIG. 5 during initialization and the variation of FIG. 3 during loop update.

As additional techniques may be developed and applied, the number of permutations will grow.

The invention therefore provides system designers with longer setup and hold time margins by adapting the timing of reads and writes in a flexible manner. Further, by adapting the timing of these operations during a loop update state, some embodiments of the invention permit adjustment of the timing to account for varying device operating characteristics. Thus, system designers implementing the invention can use tighter timing controls and address problems in conventional designs in a straightforward manner to increase overall system performance.

The particular embodiments disclosed above are illustrative only as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method comprising:
   generating a clock signal from a clock synthesizer having a plurality of phase taps;
   inputting the clock signal to a memory device to control the memory device;
   determining one or more of the plurality of phase taps with which data is to be validly written to or read from the memory device;
   selecting one of the plurality of phase taps determined to have valid data to generate a timing signal; and
   controlling with the timing signal a register in which data to be written to the memory device is to be stored, in which data to be read from the memory device is to be stored, or in which data to be written and read are both to be stored.

2. The method of claim 1, wherein the generating includes generating the clock signal from one of the plurality of phase taps.

3. The method of claim 1, wherein the determining comprises:
   writing data to the memory device using more than one of the plurality of phase taps,
   reading data from the memory device, and
   determining from the read data which data was validly written to and read from the memory device.

4. The method of claim 3, wherein the writing comprises writing an alternating 1 or 0 to the memory device for the plurality of phase taps.

5. The method of claim 3, wherein the writing comprises writing at least one datum to a respective location of the memory device for the plurality of phase taps.

6. The method of claim 1, wherein the determining includes determining one or more of the plurality of phase taps with which data may be transferred at a training frequency lower than an operating frequency for the memory device.

7. The method of claim 1 wherein the determining includes counting a number of consecutive phase taps with which data may be validly written to and read from the memory device.

8. The method of claim 1, wherein the
   determining includes determining whether the clock signal is high or low at an edge of a timing signal from one of the plurality of phase taps, and
   selecting one of the plurality of phase taps based on whether the clock signal is high or low.

9. The method of claim 1, wherein the selecting is to be performed when the memory device is initialized or during a loop update state for the memory device.

10. The method of claim 1, wherein the memory device is to operate synchronlously or asynchronously.

11. An apparatus comprising:

a memory device; and an electronic device coupled to the memory device by a bus, in which the electronic device includes a clock synthesizer having a plurality of phase taps, the clock synthesizer to,generate a clock signal to control the memory device; and the electronic device to determine one or more of the plurality of phase taps with which data is to be valid when written from or read to one or more registers and to select one that provides valid data.

12. The apparatus of claim 11, wherein the electronic device includes a graphics controller.

13. The apparatus of claim 11, wherein the memory device includes a synchronous dynamic random access memory.

14. The apparatus of claim 11, wherein the clock synthesizer includes a delay lead line.

15. The apparatus of claim 11, wherein the electronic device is to write data to the memory device using more than one of the plurality of phase taps, to read data from the memory device, and to determine from the read data which data was validly written to and read from the memory device.

16. The apparatus of claim 11, wherein the electronic device is to determine whether the clock signal is high or low at an edge of a timing signal from one of the plurality of phase taps and to select one of the plurality of phase taps based on whether the clock signal is high or low.

17. A program storage device encoded with instructions that, when executed by a computer, perform a method comprising:

programming a clock synthesizer having a plurality of phase taps to generate a clock signal to be input to a memory device to control the memory device; and determining one or more of the plurality of phase taps with which data may be validly written to and read from the memory device selecting one of the plurality of phase taps determined to have valid written and read data.

18. The program storage device of claim 17, wherein the determining comprises:

writing data to the memory device using more than one of the plurality of phase taps, reading data from the memory device, and determining from the read data which data was validly written to and read from the memory device.

19. The program storage device of claim 18, wherein the writing includes writing an alternating 1 or 0 to the memory device for the plurality of phase taps.

20. The program storage device of claim 18, wherein the writing includes writing at least one datum to a respective location of the memory device for the plurality of phase taps.

21. The program storage device of claim 17, wherein the determining includes determining one or more of the plurality of phase taps with which data may be validly written to and read from the memory device at a training frequency lower than an operating frequency for the memory device.

22. The program storage device of claim 17, wherein the selecting includes:

counting a number of consecutive phase taps with which data may be validly written to and read from the memory device, and selecting one of the one or more determined phase taps based on the counted number.

23. The program storage device of claim 17, wherein the method further comprises:

determining whether the clock signal is high or low at an edge of a timing signal from one of the plurality of phase taps, and selecting one of the plurality of phase taps based on whether the clock signal is high or low.

24. The program storage device of claim 17, wherein the selecting is performed when the memory device is initialized or when performing a loop update state for the memory device.

* * * * *